United States Patent Office 2,777,868
Patented Jan. 15, 1957

2,777,868

POLYMERIZATION OF VINYLALKOXYSILANES

Robert Y. Mixer, Kenmore, and Donald L. Bailey, Snyder, N. Y., assignors to Union Carbide and Carbon Corporation, a corporation of New York No Drawing. Application August 13, 1953, Serial No. 374,138

4 Claims. (Cl. 260—448.2)

This invention relates to the polymerization of unsaturated silanes having a vinyl group and at least one alkoxy group attached to the silicon atom.

Such unsaturated silanes may be represented by the formula:

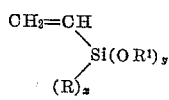

where R is a monovalent hydrocarbon radical, $R^1$ is an alkyl radical, including alkoxyalkyl, $x$ is 0, 1 or 2, and $y$ is 1, 2 or 3, $x+y$ being 3. The polymerization of such silanes by the process of this invention is through the vinyl group and results in homopolymers of the structure:

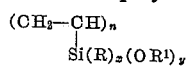

where $n$ is an integer. The alkoxy groups attached to the pendant alkoxy-silane groups are quite reactive, and may be reacted with polyhydric alcohols to form cross-linked polymers. Cross-linking can also be obtained by hydrolytic condensation to form polymers of the structure:

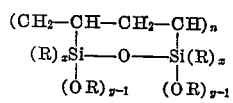

Similarly, cross-linking between different homopolymer molecules can occur.

The homopolymers of this invention differ from other vinyl siloxane polymers in that polymerization occurs through the vinyl group, rather than through the silicon atom. As a result the homopolymers contain a long hydrocarbon chain, which makes for greater compatibility with organic solvents and resins. Thus the homopolymers are useful as plasticizers and modifiers for synthetic resins. For example, they may be used as insolubilizing and toughening agents for polyvinyl alcohol. They also may be used as adhesives and sizing agents.

The polymerization of vinylalkoxysilanes has heretofore been suggested but the methods employed resulted only in residue polymers, typically brittle resins brown to black in color. On the other hand, the method of this invention results in true homopolymers which are colorless to light-colored products ranging from viscous liquids to gummy or plastic solids. It has been found that the polymerization of vinylalkoxysilanes requires the use of highly pure monomers and that only one catalyst, di-t-butyl peroxide, is markedly effective for making viscous polymers. This process is described in our copending application Serial No. 374,137. Our improvement described herein relates to certain synergists, such as alkylchlorosilanes, for increasing the extent of polymerization.

Comparative experiments were carried out to show the effectiveness of di-t-butyl peroxide as a catalyst, compared to other polymerization catalysts. The experiments were carried out by heating highly purified vinyltriethoxysilane at 125° C. for 16 hours, in the presence of various peroxides.

The polymer was evaluated on the basis of the length of time required for the unstripped material to partially flow out of a glass tube. Two marks on the tube were used to measure the flow of a given amount of material. Three different size tubes signified as A, B and C were used in order that material of widely different viscosities could be evaluated. A description of these tubes follows:

DESCRIPTION OF EFFLUX TUBES

| Tube | A | B | C |
|---|---|---|---|
| Type | 10 ml. Kimble "Normax" Vol. Pipette. | 10 ml. Kimble "Normax" Vol. Pipette. | 5 ml. Kimble "Normax" Measuring Pipette. |
| Modification | None | Tip completely removed. | Tip partially removed. |
| Length between flow points, cm | 14.40 | 16.65 | 17.05. |
| Factor reducing to Tube A | 1.0 | 13.4 | 122. |
| Calibration [1]: | | | |
| Flow time sec. @ room temp | 182 | 161 | 902. |
| Viscosity, cs. @ 25° C | 98.2 | 1,012 | 55,000. |

[1] Calibration done with silicone fluids of known viscosity.

The polymerization results using different catalysts are given in Table I.

Table I.—Effectiveness of various peroxides as catalysts for the homopolymerization of vinyltriethoxysilane

| Expt. No. | Catalyst | Product Efflux Time [1] in Seconds, Catalyst Concentration | |
|---|---|---|---|
| | | 0.10 wt. percent | 1.0 wt. percent |
| a | di-t-butyl peroxide | [2] 36,000 | [2][3] 66,000 |
| b | 2,2,bis(t-butylperoxy)butane | [2] 8,650 | |
| c | di-t-butyl diperphthalate | [4] 2,170 | |
| d | t-butyl peracetate | 77.5 | |
| e | t-butyl perbenzoate | 33.8 | 154.3 |
| f | p-t-butylcumene hydroperoxide | 23.0 | 82.7 |
| g | cumene hydroperoxide | 28.2 | 39.7 |
| h | p-menthane hydroperoxide | 21.5 | 23.9 |
| i | benzoyl peroxide | | 18.9 |
| j | cyclohexanone peroxide | 23.2 | 17.8 |
| k | p-chlorobenzoyl peroxide | | 16.9 |
| l | acetyl peroxide | 22.2 | |
| m | no catalyst—unheated seconds | 16.3 | |
| n | no catalyst—heated do | 19.4 | |

Notes for Table I:
[1] Efflux time measured in tube A, on unstripped products.
[2] Efflux time measured in tube C then extrapolated to tube A.
[3] Catalyst concentration 0.5 wt. percent for this experiment.
[4] Efflux time measured in tube B, then extrapolated to tube A.

The data in Table I clearly shows that highly viscous polymers are formed only in the presence of di-t-butyl peroxide. The catalysts in tests b to f, containing a t-butyl group were only moderately effective, the rest were ineffective.

The catalyst concentration and polymerization temperatures have an effect on polymer properties. In general, the polymer viscosity increased with increasing catalyst concentration until an optimum concentration is reached. At low catalyst concentrations, the polymer viscosity increases with increasing polymerization temperature, but at higher catalyst concentrations, the polymer viscosity appears to decrease with increasing polymerization temperature. These effects are shown in the following Table II.

Table II.—*Effect of temperature and catalyst concentration on the homopolymerization of vinyltriethoxysilane*

| Expt. No. | Di-t-butyl peroxide conc., wt. percent | Bulk Viscosity of Product (centistokes at 100° F.) | | |
|---|---|---|---|---|
| | | 125° C.[1] 16 hr.[2] | 125° C.[1] 64 hr.[2] | 150° C.[1] 16 hr.[2] |
| a | None | 8.8 | 35.5 | 8.9 |
| b | 0.02 | 15 | 110 | 1,260 |
| c | 0.10 | [3] >23,000 | 23,000 | 3,510 |
| d | 0.20 | 8,720 | | |
| e | 1.0 | 3,420 | | |

[1] Reaction temp.
[2] Reaction time.
[3] This product was stripped of 3 wt. percent lights after which it was too viscous for the test.

In addition to the specific catalyst used, and the need for pure monomers, the polymerization of the vinylalkoxysilanes is preferably conducted in an inert, substantially anhydrous atmosphere. The presence of oxygen, air or substantial amounts of moisture is undesirable, as polymer viscosity is reduced. However, some degree of polymerization can be achieved even under these adverse conditions. Preferably, however, an inert atmosphere, such as nitrogen, argon, carbon dioxide or other inert gas is maintained over the monomer during polymerization. The effect of the atmosphere on the polymerization was shown in the experiments to follow, in which vinyltriethoxysilane was heated for 16 hours at 125° C. under different atmospheres.

Table III.—*Influence of atmosphere on the homopolymerization of vinyltriethoxysilane*

[These experiments heated at 125° C. for 16 hours]

| Expt. No. | Di-t-butyl peroxide content, Atmosphere | Product Efflux[1] Time in Seconds | | |
|---|---|---|---|---|
| | | None | 0.02 wt. percent | 0.1 wt. percent |
| a | Dry argon | <2 | 29.6 | 3,880 |
| b | Air | <2 | 4.2 | 220 |
| c | Oxygen | <2 | <2 | 6.9 |
| d | Argon saturated with water | <2 | 19 | <2 |

[1] Efflux time measured in tube B.

The following examples will further illustrate the practice of the invention:

EXAMPLE 1

Di-t-butyl peroxide (0.50 gram) was diluted to 25.0 ml. with purified vinyltriethoxysilane in a Normax volumetric flask to form a catalyst solution. Then 21.5 ml. of purified vinyltriethoxysilane (B. P. 70° C. @ 30 mm. Hg $n_D^{25}$ 1.3966, $d_4^{25}$ 0.9036; $MR_D$; calculated 50.61; observed 50.66; infrared spectrum No. 619, efflux time unheated 16.4 seconds in tube A) and 1.00 ml. of the catalyst solution were placed in a rigorously cleaned, 25 mm. x 200 mm. Pyrex test tube flushed with argon and equipped with a well-fitting cork. Thus the contents of the tube were 22.5 ml. (20.0 grams) of vinyltriethoxysilane and 0.02 gram (or 0.10 wt. percent) of di-t-butyl peroxide. The contents were shaken and then the space above the contents again flushed with argon. The contents and test tube were heated in a constant temperature oil bath at 125° C. for 16 hours. The polymerized material was stripped of monomer by heating at 125° C. and 1 mm. Hg absolute pressure until no more monomer was removed (about 1 hour). Approximately 0.5 gram of monomer was removed indicating a 97% conversion. The resulting product was a clear, colorless, very viscous liquid having the following physical properties:

$n_D^{25}$=1.4445
$d_4^{24}$=between 0.97 to 1.00
Infrared spectrum=No. 621
Efflux time in tube C=570 seconds
Efflux time extrapolated to tube A=65,000 seconds The product was examined by infrared absorption and the several absorption bands accepted as signifying the presence of the vinyl (C=C) double bond were shown to be missing. This proves that the vinyl group has reacted.

INFRARED ANALYSIS

| Bands | | Probable Assignment |
|---|---|---|
| Monomer | Polymer | |
| 3.27μ | Missing | C—H stretch in vinyl group. |
| 6.22μ | Missing | C=C stretch in vinyl group. |
| 7.09μ | Reduced | $CH_2$ deformation in vinyl group (sym. in-plane). |
| 7.83μ | Missing | CH deformation in vinyl group (in-plane). |
| 9.88μ | Missing | CH deformation in vinyl group (out-of-plane). |
| 10.38μ | | CH deformation in vinyl group (out-of-plane) plus Si-O-C vibration. |
| | 10.45μ | Si-O-C vibration (less intense than combined band at 10.38μ in monomer). |

EXAMPLE 2

The homopolymerization of the vinylalkoxysilanes also occurs when a monovalent hydrocarbon radical, such as an aryl or alkyl radical, replaces one or two of the alkoxy groups. Thus vinylethyldiethoxysilane, vinylphenyldiethoxysilane and vinyldiphenylethoxysilane were polymerized under conditions tabulated below by heating for 16 hours at 125° C.

Table IV.—*Homopolymerization of other vinylethoxysilanes*

| Expt. No. | Di-t-butyl peroxide conc., Monomer | Product Efflux[1] Time in Seconds | | | |
|---|---|---|---|---|---|
| | | None | 0.02 wt. percent | 0.10 wt. percent | 0.5 wt. percent |
| a | Vinyltriethoxysilane | 19.4 | 136 | [2] 36,000 | [2] 66,000 |
| b | Vinylethyldiethoxysilane | 17.2 | 18.8 | 25 | [2] 6,000 |
| c | Vinylphenyldiethoxysilane | 19.3 | 23.2 | 33.1 | [2] 134,000 |
| d | Vinyldiphenylethoxysilane | 23.2 | 27.7 | 36.0 | [2] 8,870 |

[1] Efflux time measured in tube A.
[2] Extrapolated values from times measured in tube C.

The physical properties of the vinyldiphenylethoxysilane monomer were: B. P. 148° C. at 5.0 mm. Hg; $n_D^{25}$ 1.5504; $d_4^{25}$ 1.0169; $MR_D$ observed, 79.73, calculated, 79.47. When samples of vinyldiphenylethoxysilane containing 1% di-t-butyl peroxide were heated for 16 hours at 125° C., the product was a plastic solid; when heated for 16 hours at 150° C., the product was a brittle solid, and when heated for 144 hours at 100° C., the product was a viscous liquid having an efflux time in tube A of 18,200 seconds.

EXAMPLE 3

Vinyl alkoxysilanes containing substituents on the alkyl may also be polymerized. Thus vinyltris-(2-methoxyethoxy)silane was polymerized under the conditions tabulated below:

Table V.—Catalyzed homopolymerization of vinyltris-(2-methoxyethoxy)silane

| Expt. No. | Polymerization Conditions | Di-t-butyl Peroxide, Wt.-Percent | Efflux Time [a] of Polymer (sec. in Tube A) |
|---|---|---|---|
| a | 16 hr. at 125° C | 0.00 | [b] 22.4 |
| b | do | 0.02 | 44.5 |
| c | do | 0.10 | 180 |
| d | do | 0.50 | 540 |
| e | do | 1.00 | 555 |
| f | 5 hr. at 150° C | 0.10 | 181 |
| g | do | 1.00 | 226 |

[a] On bulk polymer.
[b] Unheated monomer 18.9 sec.

The foregoing invention is described and claimed in an application filed by R. Y. Mixer and D. L. Bailey, Serial No. 374,137 entitled "Polymerization of Vinylalkoxyilanes." Our present improvement resides in the discovery that very small amounts of alkylchlorosilanes exert a synergistic effect on the polymerization of vinylalkoxysilanes, in cooperation with the catalyst, specifically an organic peroxide containing a tertiary butoxy group, such as di-t-butyl peroxide, to form polymers of higher viscosities. This synergistic effect of the alkylchlorosilanes is limited to amounts varying from a trace to 0.001% to 0.01% by weight of the vinylalkoxysilanes. Amounts of the alkylchlorosilanes as high as 0.10% by weight of the vinylalkoxysilane completely inhibit the polymerization. The alkylchlorosilanes effective for my purpose have the structure $R_nSiCl_{4-n}$, where R is an alkyl radical, such as methyl, ethyl, propyl, isopropyl, butyl, isobutyl, amyl, hexyl and the like, and n is 1, 2 or 3. The following table shows the effect of several alkylchlorosilanes on the polymerization of vinyltriethoxysilane when heated for 16 hours at 125° C.

Table VI.—Effect of chlorosilanes on the homopolymerization of vinyl triethoxysilane

| Expt. No. | Di-t-butyl Peroxide, wt.-Percent | Chlorosilane, wt. percent | Product Efflux[1] Time in Seconds | | | | |
|---|---|---|---|---|---|---|---|
| | | | None | 0.0001 | 0.001 | 0.01 | 0.10 |
| a | 0.02 | (Amyltrichlorosilane) | 10.2 | 45.2 | 14.8 | 5.3 | |
| b | 0.10 | do | 2,650 | 6,500 | 2,780 | 438 | <2 |
| c[2] | 0.50 | do | 2,880 | 4,500 | 2,900 | <2 | <2 |
| d | 0.00 | (Triethylchlorosilane) | <2 | <2 | <2 | <2 | <2 |
| e | 0.02 | do | 28.7 | 100 | 2 | 3.3 | <2 |
| f | 0.10 | do | 2,430 | 4,200 | 3,880 | 2,300 | 17.1 |

[1] Efflux time measured in tube B.
[2] Heated for 64 hours instead of 16 hours.

What is claimed is:

1. In the polymerization of vinylalkoxysilanes in the presence of an organic peroxide containing a tertiary butoxy group to form homopolymers, which vinylalkoxysilanes have the structure:

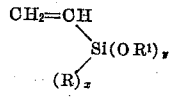

where R is a monovalent hydrocarbon radical, $R^1$ is an alkyl radical, $x$ is an integer from 0 to 2, $y$ is an integer from 1 to 3, and $x+y=3$, the improvement which resides in carrying out the polymerization in the presence of an alkylchlorosilane in an amount varying from a trace to 0.001% by weight of the vinylalkoxysilane, said alkylchlorosilane having the structure $R''_nSiCl_{4-n}$, where $R''$ is an alkyl radical, and $n$ is an integer from 1 to 3.

2. In the polymerization of vinylalkoxysilanes in the presence of di-t-butyl peroxide to form homopolymers, which vinylalkoxysilanes have the structure:

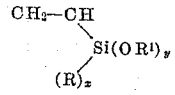

where R is a monovalent hydrocarbon radical, $R^1$ is an alkyl radical, $x$ is an integer from 0 to 2, $y$ is an integer from 1 to 3, and $x+y=3$, the improvement which resides in carrying out the polymerization in the presence of an alkylchlorosilane in an amount varying from a trace to 0.001% by weight of the vinylalkoxysilane, said alkylchlorosilane having the structure $R''_nSiCl_{4-n}$, where $R''$ is an alkyl radical, and $n$ is an integer from 1 to 3.

3. In the polymerization of vinyltriethoxysilane in the presence of di-t-butyl peroxide to form homopolymers, the improvement which resides in carrying out the polymerization in the presence of amyltrichlorosilane in an amount varying from a trace to 0.001% by weight of the vinyltriethoxysilane.

4. In the polymerization of vinyltriethoxysilane in the presence of di-t-butyl peroxide to form homopolymers, the improvement which resides in carrying out the polymerization in the presence of triethylchlorosilane in an amount varying from a trace to 0.001% by weight of the vinyltriethoxysilane.

References Cited in the file of this patent

Wagner et al.: "Ind. and Eng. Chem.," vol. 45, pages 367–373 (1953).